United States Patent [19]

Fenton

[11] Patent Number: 5,076,934
[45] Date of Patent: Dec. 31, 1991

[54] DESALINATION OF BRACKISH WATER FROM OIL WELLS

[75] Inventor: Donald M. Fenton, Anaheim, Calif.

[73] Assignee: Union Oil Company of California, Los Angeles, Calif.

[21] Appl. No.: 659,027

[22] Filed: Feb. 21, 1991

[51] Int. Cl.$^5$ ...................... B01D 61/02; B01D 61/08
[52] U.S. Cl. ................................ 210/642; 210/500.29
[58] Field of Search ................. 420/38; 203/DIG. 17, 203/DIG. 24, 10, 11; 202/232-238, 200, 163; 210/642, 500.28-500.32

[56] References Cited

U.S. PATENT DOCUMENTS 3,895,940  7/1975  Bieber .................................. 420/38

OTHER PUBLICATIONS

"Reverse Osmosis", by Richard G. Sudak, *The Handbook of Industrial Membrane Technology*, Mark Porter, editor, Noyes Publications 1990, Chapter 4.
"A Thirsty California is Trying Desalination", by Lawrence M. Fisher, New York Times, Nov. 18, 1990.
"California Water Shortage Poses Challenges for State Policymakers", *California Water*, A Special Report by the California Chamber of Commerce, Jun. 15, 1990.

*Primary Examiner*—Frank Sever
*Attorney, Agent, or Firm*—Charles L. Hartman; Gregory F. Wirzbicki

[57] ABSTRACT

Non-brackish water can be produced from the brackish water found in many inactive oil wells. The inactive well is perforated at the level known to have brackish water and the water is pumped out. The brackish water is desalinated producing non-brackish water, preferably, potable water. A preferred method of desalination is by reverse osmosis.

33 Claims, No Drawings

DESALINATION OF BRACKISH WATER FROM OIL WELLS

BACKGROUND OF THE INVENTION

1. Field of the Invention

This invention relates to methods of activating oil wells that no longer produce oil, particularly to methods of reusing old oil wells, especially those on offshore oil platforms, and the use of these wells as a water source, as well to as to systems for desalinating water that include old oil wells that produce brackish water.

2. State of the Art

When an oil well ceases to produce oil, either because the well runs dry or because it starts to produce large amounts of some less desired alternative product, for example, water, the well is inactivated. First, the hole is plugged temporarily by closing its valves, but the well must be physically blocked with concrete or the like to permanently plug it. Then, if a well site is to be abandoned, whatever superstructure that might exist must be removed from the site. In the case of inactivating all the oil wells on offshore oil platforms, the process is particularly expensive. As on land, each of the wells must be plugged. However, the entire superstructure of the platform must be removed from its moorings on or near the sea floor and the platform removed from the site as a potential hazard to navigation. Inactivating is an expected occurrence in the life of an oil well, but it is expensive.

Brackish water, one alternative product associated with many oil wells, is normally thought to be of little value, because, although it is not as salty as sea water, it is too salty to be used for either human consumption or agriculture. However, many oil wells are located in arid or semi-arid locales where potable water can be an extremely valuable resource. In California, one such semi-arid locale, the increasing population has an ever increasing need for water. Moreover, parts of California have suffered severe drought, and may continue to suffer from drought, straining the available water resources so much that many local governments in California plan to build desalination facilities to desalinate sea water, despite the expense.

Not all sources of water are considered suitable for creation of potable water, that is, water for human consumption. In some instances the source of water is considered unsuitable even for agricultural use. Municipal waste water is an example of a source of water not considered suitable for human consumption. In some areas of the country it is treated for reuse, but not for human consumption.

For most purposes, the most widely used methods of desalinating salt water are distillation and reverse osmosis. An over view of reverse osmosis technology is found in *The Handbook of Industrial Membrane Technology*, Mark Porter editor, Noyes Publications 1990, chapter 4, hereby incorporated by reference in its entirety. This publication discloses the implementation of reverse osmosis technology in many environments, using different feed waters, different membranes, and processing to different purities. One feed water not discussed was brackish water from inactivated oil wells.

It would be useful if one could use the non-oil producing wells to produce potable water from the brackish water that is now discarded.

SUMMARY OF THE INVENTION

Brackish water found in many inactivated oil wells can be desalinated to produce non-brackish water. The inactive oil well is perforated at a level known to have brackish water. The brackish water is pumped out and desalinated. Preferably, potable water is produced. A preferred method of desalination is by reverse osmosis.

Because the characteristics of the geological formations penetrated by an inactive well are generally known, a level known to be at a geological formation capable of producing brackish water, the casing of the well is penetrated, and brackish water is recovered. The recovered brackish water is then desalinated, that is, at least some dissolved solids are removed. It is preferred to make potable water for human consumption or water for agricultural use.

An important discovery of this invention is that brackish water heretofore thought useless from inactive oil wells can be used to produce inexpensive potable water. The importance can be seen in the case of Santa Barbara, California, where water is in short supply even in years with normal rain fall. The city has, from 1986 to 1991, experienced a serious continuing drought placing the water supply in critical shortage. Therefore, the city is seriously considering desalination of sea water, even though present the cost is about $6.00 per thousand gallons. The use of this invention, on the other hand, could produce water for about $1.50 to $2.00 per thousand gallons. It would be possible to use this invention in Santa Barbara, since the city is near many oil wells, both on land and offshore.

DETAILED DESCRIPTION OF THE INVENTION

"Brackish water," as used herein, refers to water containing from 500 ppm to 10,000 ppm total dissolved solids, and especially water containing between 500 ppm and 5000 ppm total dissolved solids. In contrast, sea water is considered to contain nominal total dissolved solids of about 35,000 ppm. "Non-brackish" water refers to water containing from 100 ppm to 500 ppm total dissolved solids. "Potable water," which is that water suitable for human consumption, has from 100 ppm to 250 ppm total dissolved solids. Water suitable for agricultural use has from 200 ppm to 500 ppm total dissolved solids.

It is preferred that the brackish water flow to the surface under its own pressure, but it is acceptable if the water can be readily pumped from the hole. Typical flow rates are greater than ten cubic feet per minute, preferably greater than twenty cubic feet per minute. The means of recovery of the brackish water can be by any standard method. The brackish water may not be at the level of the oil that had been produced, requiring the penetration of the well casing to obtain the water from the inactive oil well.

Since the brackish water removed from an inactive oil well will certainly have come into contact with hardware that formerly contacted crude oil, the water may need cleaning as an integral part of desalination. It is greatly preferred that this be done prior to desalination to avoid contacting the desalination apparatus with oily residue or corrosive gases and the like. In particular, any oily residue may be separated by flotation, by skimming the surface of the water to remove floating oily debris. Then the water can be further purified by filtration, or by passage over an adsorbant, for example, activated charcoal or diatomaceous earth, to remove any gases or emulsified oil that might be present in the water. Any gases in the water are removed by, for example, sparging. The brackish water is desalinated to produce non-brackish water by methods including reverse osmosis, freezing the water and recovering the fresh water ice and evaporative recovery, for example, distillation. The method chosen depends on the local environment and on cost. Usually, reverse osmosis will be the preferred desalination technique. The non-brackish water, produced by the chosen desalination process, is suitable for agricultural use and may be potable water.

In the process of reverse osmosis, a pressurized water solution contacts a membrane on a first side partitioning the solution into a less concentrated solution on the second side of the membrane and a more concentrated solution on the first. The less concentrated solution, the non-brackish water, is then be collected. The more concentrated water is disposed of. Since the osmotic pressure of any aqueous solution depends on the concentration of the solution, dilute solutions can be more easily desalinated than more concentrated solutions using reverse osmosis. Reverse osmosis is particularly preferred as a desalination method in this invention because the membrane will tend to filter out whatever oil residue and dissolved gases and the like are in the water. Although it is not known exactly how membranes work in reverse osmosis, the generally accepted theory is that they work as filters, allowing smaller molecules to pass, but preventing larger molecules from passing through the membrane. Therefore, the relatively larger hydrocarbon molecules are easily removed from water.

In the process of this invention the membrane selected can be any membrane known to partition aqueous solutions. Suitable membranes known to the art include cellulose acetates, especially cellulose diacetate and cellulose triacetate and the combination of cellulose diacetate and cellulose triacetate, cellulose nitrate, asymmetric aromatic polyamides, as well as composite membranes such as a polyfurane separation membrane laid on a polysulfone support layer. The precise operational conditions depend heavily on the concentration of the brackish water, but, in general, are those shown in Table 1.

TABLE 1

|  | Typical Range | Preferred Range |
| --- | --- | --- |
| Pressure | 250 to 450 psig | 300 to 375 psig |
| pH of feed | 4 to 8 | 5.5 to 7.5 |
| Temperature | 0° C. to 80° C. | 10° C. to 60° C. |

Typical membranes produce non-brackish water at a rate of between about 400 to 1600 liters of non-brackish water per day per square meter of membrane.

In one embodiment an inactivated oil well is used, if possible. The oily residue and gases are removed and the brackish water desalinated near the well, although the brackish water may be transported to a remote site for processing. In this manner, several wells can be processed at one desalination facility. It is preferred to desalinate the brackish water using reverse osmosis. The non-brackish water product can then be transported to a location of use. In the case of water being produced for agriculture, the water can be transported in previously existing irrigation facilities.

An offshore oil platform may have many wells located thereon. In another embodiment inactive oil wells on offshore oil platforms are used. It is preferred to continue using offshore oil platforms having no active oil wells, if brackish water can be removed from at least one non-producing well on the platform. Typically, these platforms are located in the ocean, surrounded by sea water. Therefore, the brackish water down hole can be recovered at the platform in preference to the surrounding salt water. The oily residue and gases are removed on the platform and the brackish water desalinated at the platform. It is preferred to use reverse osmosis to desalinate brackish water on oil platforms. Then the more concentrated waste water can be readily and environmentally safely discarded in the ocean, and the non-brackish water is transported to shore for use.

The water produced on an offshore platform can be transported by piping the water to the location of use. It is preferred to pipe the water through pipes formerly used for transporting oil, since these pipes already connect the platform with the shore and at least some of them will no longer be used for transporting oil. These pipes are previously prepared for the task. Such preparation includes cleaning the pipes by use of suitable chemical agents, for example detergents or other surfactants or oil dispersants and physically scrubbing the interior of the pipes by sending a pig through the pipes. The pipes may also have their interiors coated with a substantially oil impermeable material. Of course dedicated pipes can be laid exclusively for transport of water produced on the platform.

An apparatus for producing non-brackish water from the brackish water includes an inactivated oil well penetrating a plurality of geological formations of known characteristics, at least some of said formations are known to contain flowable brackish water. The well will have a perforated well casing at a level of a geological formation known to contain flowable brackish water. In this apparatus a desalination plant at the site of the inactive oil well receives flowable brackish water from the inactive oil well. The brackish water recovered from the non-producing well is desalinated at the desalination plant, preferably producing non-brackish water. In one preferred embodiment a plurality of wells provides brackish water to a central desalination plant located at the site of one inactive oil well. It is preferred that the inactive oil well be located on an offshore oil platform. When the oil well is located on an offshore platform, the desalination plant is preferably located at the site of the inactive oil well on the offshore oil platform. A plurality of platforms can provide brackish water to a central desalination plant located on one platform. The apparatus includes means for separating any oil residue from the recovered brackish water and means for removing any gases from the recovered brackish water. The apparatus can include an evaporative plant, a reverse osmosis plant, or a means for freezing the water and recovering the fresh water ice to desalinate the water. The apparatus includes piping the water through pipes formerly used for transporting oil, after preparing the piping for transporting non-brackish water.

As an example of using brackish water from an inactive oil well, it is known that an inactive well located at the Hueneme field in California produces brackish water at a stratum of sand 250 to 300 feet thick and between 500 to 750 feet deep. At this stratum the well casing is perforated using standard well perforation technology. This stratum produces brackish water containing about 500 to 600 ppm dissolved solids (based on conductivity measurements that assume that all solids are NaCl). After the brackish water is removed from the well, the oily residue and any emulsion is skimmed from the water. Then the brackish water is passed over activated charcoal, removing any odors or colored material from the water. The pH of the water is then adjusted to between 4.5 and 7.5 by adding hydrochloric acid or sodium or potassium hydroxide. The water is then pressurized to 300 psig and contacted with a cellulose triacetate membrane. After the first pass 50% of the feed water is recovered as a non-brackish water product containing a total dissolved solids of no more than 200 ppm. The concentrated brackish water is contacted with a second membrane, and after the second pass 50% of the concentrated brackish water is recovered as a non-brackish water product containing a total dissolved solids of no more than 200 ppm, for a total conversion of 75% of the brackish water converted into nonbrackish water. The membrane produces about 850 liters of water a day per square meter of membrane. The desalinated, non-brackish water is then passed over crushed lime to restore taste.

Although this invention has been primarily described in conjunction with examples and by references to embodiments thereof, it is evident that many alternatives, modifications, and variations will be apparent to those skilled in the art in light of the foregoing description. Accordingly, it is intended to embrace within the invention all such alternatives, modifications, and variations that fall within the spirit and scope of the appended claims.

What is claimed is:

1. An apparatus for producing non-brackish water from brackish water found in an inactivated oil well comprising:
   at least one inactive oil well located on an offshore oil platform, said well having a perforated well casing at a level of a geological formation known to contain flowable brackish water;
   a desalination plant located on the offshore platform receiving flowable brackish water from the inactive oil well; and
   means to transport the non-brackish water produced by the desalination plant.

2. The apparatus of claim 1 wherein a plurality of wells provide brackish water to a central desalination plant located on the offshore platform.

3. The apparatus of claim 1 wherein a means for separating oil residue from the recovered brackish water located at the oil platform separates oily residue before the brackish water contacts the desalination plant.

4. The apparatus of claim 1 wherein a means for removing gases from the recovered brackish water located at the oil platform removes gases before the brackish water contacts the desalination plant.

5. The apparatus of claim 1 wherein the desalination plant comprises a means for evaporative recovery.

6. The apparatus of claim 1 wherein the desalination plant comprises a reverse osmosis plant.

7. The apparatus of claim 1 wherein the desalination plant comprises a means for freezing the water and recovering the fresh water ice.

8. The apparatus of claim 1 wherein the non-brackish water produced is transported through pipes formerly used for transporting oil.

9. A method of using an inactivated oil well comprising:
   ceasing oil production in an inactive oil well having a well casing that penetrates a plurality of geological formations;
   recovering brackish water from the inactive oil well from a geological formation containing flowable brackish water; and
   desalinating the brackish water producing non-brackish water.

10. The method of claim 9 wherein the oil well is located on an offshore oil platform surrounded by salt water.

11. The method of claim 9 wherein the geological formation is the same as that which formerly produced oil.

12. The method of claim 11 including the step of separating oil residue from the brackish water after the recovering step, but before the desalinating step.

13. The method of claim 11 including the step of separating gases from the brackish water after the recovering step, but before the desalinating step.

14. The method of claim 9 wherein the geological formation is different than that which formerly produced oil.

15. The method of claim 14 including perforating the oil well casing at the level of the geological formation that produces brackish water.

16. The method of claim 14 including the step of separating oil residue from the brackish water after the recovering step, but before the desalinating step.

17. The method of claim 14 including the step of separating gases from the brackish water after the recovering step, but before the desalinating step.

18. The method of claim 9 wherein the desalinating step comprises evaporative recovery.

19. The method of claim 9 wherein the desalinating step comprises reverse osmosis.

20. The method of claim 9 wherein the desalinating step comprises freezing the water and recovering the fresh water ice.

21. The method of claim 9 wherein the non-brackish water produced comprises water suitable for agricultural use.

22. The method of claim 9 wherein the non-brackish water produced comprises potable water.

23. The method of claim 9 including the step of piping the non-brackish water produced to a location of use after the desalinating step.

24. A method of producing non-brackish water comprising:
   ceasing oil production in an inactive oil well having a well casing that penetrates a plurality of geological formations;
   perforating the well casing of the inactive oil well at a level known to contain flowable brackish water;
   recovering the brackish water from the inactive oil well;
   separating oil residue from the recovered brackish water;
   removing gases from the recovered brackish water;
   pressurizing the brackish water; and
   contacting the pressurized brackish water with a reverse osmosis membrane.

25. The method of claim 24 wherein the separating step comprises passing the water over activated charcoal.

26. The method of claim 24 including the step of adjusting the pH of the brackish water to between 4 and 6 before contacting the brackish water with the reverse osmosis membrane.

27. The method of claim 24 wherein the pressurizing step comprises increasing the pressure on the brackish water to between 250 and 450 psig.

28. The method of claim 24 wherein the contacting step further comprises contacting the pressurized brackish water with a reverse osmosis membrane selected from the group consisting of cellulose acetate, cellulose diacetate, cellulose triacetate, the combination of cellulose diacetate and cellulose triacetate, cellulose nitrate, and asymmetric aromatic polyamides.

29. The method of claim 24 wherein the contacting step further comprises contacting the pressurized brackish water with a composite membrane of a polyfurane separation membrane laid on a polysulfone support layer.

30. The method of claim 24 wherein the reverse osmosis membrane produces non-brackish water comprising water suitable for agricultural use.

31. The method of claim 24 wherein the reverse osmosis membrane produces non-brackish water comprising potable water.

32. The method of claim 24 wherein the reverse osmosis membrane produces non-brackish water transportable through pipes to a location of use.

33. The method of claim 32 wherein the transportable water is placed in pipes formerly used for transporting oil.

* * * * *